(12) United States Patent
Calamia

(10) Patent No.: US 9,828,004 B2
(45) Date of Patent: Nov. 28, 2017

(54) SKI POLE HOLDER

(76) Inventor: Gerald Calamia, Phoenix, AZ (US)

( * ) Notice: Subject to any disclaimer, the term of this patent is extended or adjusted under 35 U.S.C. 154(b) by 0 days.

(21) Appl. No.: 13/083,453

(22) Filed: Apr. 8, 2011

(65) Prior Publication Data

US 2011/0248058 A1    Oct. 13, 2011

Related U.S. Application Data

(60) Provisional application No. 61/322,764, filed on Apr. 9, 2010.

(51) Int. Cl.
| | |
|---|---|
| *B60R 7/00* | (2006.01) |
| *B61B 12/00* | (2006.01) |
| *A63C 11/02* | (2006.01) |
| *A47F 1/04* | (2006.01) |
| *A47F 7/00* | (2006.01) |
| *A63B 55/00* | (2015.01) |
| *A47B 96/06* | (2006.01) |
| *A47G 29/00* | (2006.01) |
| *A47K 1/00* | (2006.01) |
| *E04G 3/00* | (2006.01) |
| *E04G 5/06* | (2006.01) |
| *F21V 21/00* | (2006.01) |
| *F21V 35/00* | (2006.01) |
| *A47G 1/10* | (2006.01) |

(Continued)

(52) U.S. Cl.
CPC ............ *B61B 12/002* (2013.01); *A63C 11/02* (2013.01); *A63C 11/023* (2013.01); *A63C 11/025* (2013.01); *B60R 7/00* (2013.01); *A47B 81/00* (2013.01); *A47F 7/0028* (2013.01); *A63B 55/10* (2013.01); *A63B 60/62* (2015.10); *A63B 71/0036* (2013.01); *A63B 71/0045* (2013.01); *A63C 11/00* (2013.01); *A63C 11/22* (2013.01); *A63C 11/228* (2013.01); *Y02T 30/40* (2013.01)

(58) Field of Classification Search
CPC .. A63C 7/108; A63C 7/10; A63C 5/00; A63C 11/02; A63C 11/228; A63C 11/023; A63C 11/025; A63C 11/22; A63C 11/00; A63C 11/007; F16M 113/02; A45F 5/14; A63B 71/005; A63B 71/0045; A63B 55/10; A63B 60/62; A63B 1/0036; B60R 9/12; A47B 81/00; A47F 7/0028
USPC ......... 248/316.2, 316.1, 316.6, 316.8, 309.1, 248/231.31, 231.61, 230.2, 230.5, 110, 248/113, 689, 423, 229.16, 229.26, 230.7, 248/111, 218.4, 219.1, 219.2, 229.24, 248/229.14, 214, 219.3, 225.11, 316.7, 248/512, 682; 280/820, 809, 814; 211/60.1, 85.7, 104, 70.2, 70.5, 70.6; 224/401, 917, 917.5
See application file for complete search history.

(56) References Cited

U.S. PATENT DOCUMENTS

| | | | | | |
|---|---|---|---|---|---|
| 1,904,231 | A | * | 4/1933 | Hodgman | .............. A63B 55/10 211/113 |
| 2,371,433 | A | * | 3/1945 | Davis | ....................... B25H 3/04 211/162 |

(Continued)

*Primary Examiner* — Leslie A Nicholson, III
*Assistant Examiner* — Taylor Morris
(74) *Attorney, Agent, or Firm* — Hartman Titus PLC; Joseph W. Mott

(57) ABSTRACT

A ski pole holder for attachment to a chairlift is disclosed. A lower body portion includes a slot slightly wider than a ski pole shaft. An upper body portion includes a floor with a slot corresponding to the lower body slot, a peripheral wall with an opening in front, and an attachment to a bar of the chairlift.

16 Claims, 4 Drawing Sheets

(51) Int. Cl.
*F16M 13/00* (2006.01)
*F16M 11/00* (2006.01)
*A63C 11/00* (2006.01)
*A63C 11/22* (2006.01)
*A63B 71/00* (2006.01)
*A63B 60/62* (2015.01)
*A63B 55/10* (2006.01)
*A47B 81/00* (2006.01)

(56) References Cited

U.S. PATENT DOCUMENTS

| | | | | |
|---|---|---|---|---|
| 3,620,174 A * | 11/1971 | Dentino | | 108/151 |
| 3,737,956 A * | 6/1973 | Gragert | | A63C 11/025 280/814 |
| 3,893,606 A * | 7/1975 | Hofmann | | A63C 11/023 211/70.5 |
| 4,002,349 A * | 1/1977 | Dopp | | A63C 11/021 280/809 |
| 4,134,182 A * | 1/1979 | Ramsby | | A63C 11/025 280/814 |
| 4,145,062 A * | 3/1979 | Stiemert | | A63C 11/22 15/105 |
| 4,175,683 A * | 11/1979 | Shields | | 280/814 |
| 4,208,038 A * | 6/1980 | Reid | | E04H 17/00 256/21 |
| 4,247,132 A * | 1/1981 | Shields | | 280/814 |
| 4,537,403 A * | 8/1985 | Farina | | 473/203 |
| 4,583,647 A * | 4/1986 | Schinzing | | A47B 81/007 211/60.1 |
| 4,718,138 A * | 1/1988 | Brown | | A63C 11/22 15/237 |
| 5,013,066 A * | 5/1991 | Adkins | | 280/809 |
| 5,238,109 A * | 8/1993 | Smith | | A63B 55/00 206/315.2 |
| 5,678,700 A * | 10/1997 | Crosson, Jr. | | A47B 81/005 211/60.1 |
| 5,884,781 A * | 3/1999 | Ehrhart | | A63C 11/028 211/60.1 |
| 5,996,511 A * | 12/1999 | Swoger | | 108/157.13 |
| 6,039,656 A * | 3/2000 | Fireman | | 473/131 |
| 6,186,383 B1 * | 2/2001 | Kobdish | | B62J 6/00 224/420 |
| 6,481,583 B1 * | 11/2002 | Black et al. | | 211/70.6 |
| D483,427 S * | 12/2003 | Lim | | D21/796 |
| 6,749,591 B1 * | 6/2004 | McNally | | A61M 39/281 211/60.1 |
| 7,273,233 B2 * | 9/2007 | Moller | | A63C 11/02 280/809 |
| 7,784,624 B1 * | 8/2010 | Pinto | | A63B 71/0045 211/85.7 |
| 2006/0226321 A1 * | 10/2006 | Tracy | | 248/301 |
| 2007/0193965 A1 * | 8/2007 | Cialdella et al. | | 211/70.2 |
| 2011/0174945 A1 * | 7/2011 | Wood | | A63B 71/0045 248/225.11 |

* cited by examiner

SKI POLE HOLDER

CROSS REFERENCE TO RELATED APPLICATIONS

This application claims the benefit of U.S. Provisional Patent Application 61/322764, filed Apr. 9, 2010.

BACKGROUND OF THE INVENTION

The present invention relates to a ski pole holder and water or sports drink holder for attachment to a ski lift on its restraining bar or the side bar of a chair on a ski lift that does not have a restraining bar.

Skiers, once on a ski lift, are required to carry or hold their poles in their hands or to sit on top of them when room allows for this while traveling on the chair lift. Skiers must maintain control over their poles because if dropped off the lift, the pole cannot be retrieved immediately, leaving the skier to traverse the mountain without two poles. Additionally, chair lifts often pass over unreachable, out of bounds areas on the ski mountain, so retrieving dropped poles can pose dangerous conditions for the skier, ski patrol or ski resort lift operators who undertake recovery tasks.

Ideally, the ski lift ride is an opportunity for the skier to relax, and prepare for the next run. Skiers can adjust their ski clothing, reset and clean off their goggles, apply lip and face ointment for the harsh winter weather, or unfold and study a trail map. All of these activities are hampered if the skiers must maintain a firm grip on their ski poles. Sitting on the poles is not an ideal solution because the motion needed to secure the poles and then retrieve them at the top of the lift is awkward and easily leads to dropping the poles. A simple, secure holder to engage the poles during the lift ride would alleviate some of these problems.

BRIEF SUMMARY OF THE INVENTION

The present invention provides a convenient holder into which the skier may slip the shafts of his ski poles to securely retain the poles during the lift ride. The holder may be attached to the safety bar of the lift chair or to a side component if there is no safety bar. In some embodiments, the holder may be configured as an open cylinder to also hold water bottles or sports bottles

DETAILED DESCRIPTION

Ski poles have long been of nearly universal design, with structurally minor variations for alpine, racing, telemark and cross country use. A shaft of appropriate length ends in a tip that is to be planted in the snow during skiing maneuvers. Partway up the shaft from the tip, generally about 3 inches (75 mm), is a basket that extends radially from the shaft. The basket limits the depth of penetration of the shaft into snow when the pole is thrust downward. At the top of the pole, opposite from the tip, is a handle or grip.

Skiers at an alpine resort generally engage in alpine, racing or telemark skiing, and their pole equipment is similar. Most often, the grip incorporates a thickened body for easy grasping by a skier with a heavily-padded ski glove, notches or ridges to comfortably accommodate finger placement and an attached safety strap. Grips may also include a widened collar, plate or other extension to prevent the hand from slipping downward off the grip when the pole is planted. Some grips incorporate a plastic hand shield forward of the grasping hand. Grips always are fitted around the top of a shaft, so the grip has a larger diameter than the portion of the shaft to which it is attached.

Figure 1:
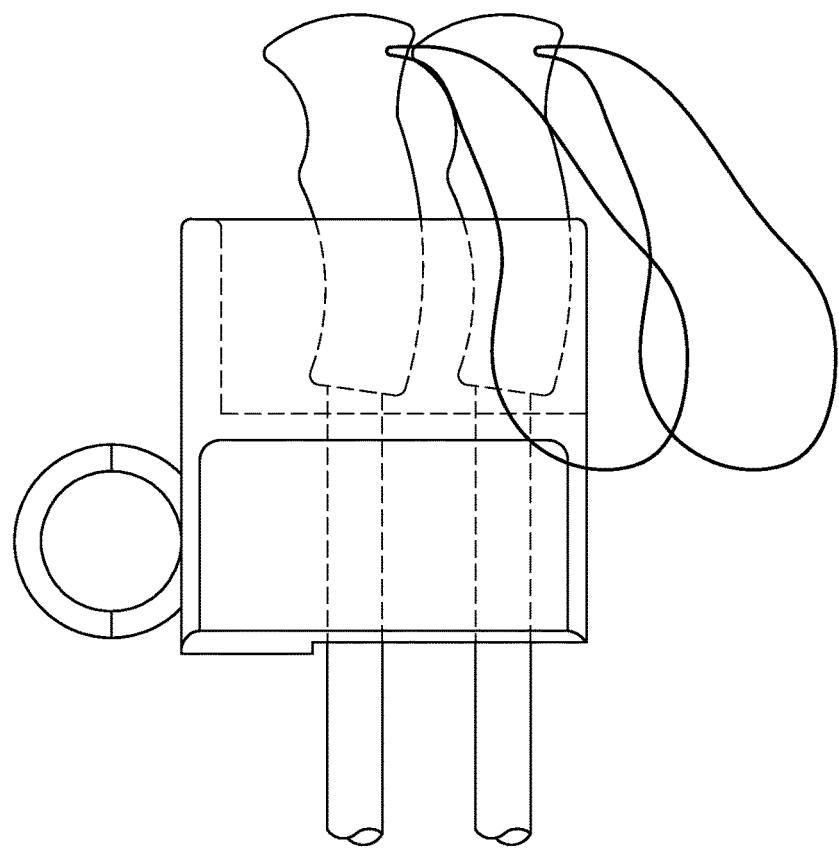
FIG. 1 is a side view of an embodiment of the invention, showing a pair of ski poles being held thereby.

A ski pole holder may take advantage of the difference in diameters between the shaft and the handle of a ski pole. Nearly all poles have almost the same shaft diameter at the top, about ¾ inch to 1 inch (20 mm-25 mm). Affixed grips range from about ¼ inch (6.5 mm) to up to 1½ inches (38 mm) wider than the shaft at the point of attachment. FIG. 1 shows an embodiment of the invention with a pair of ski poles engaged.

Figure 2:
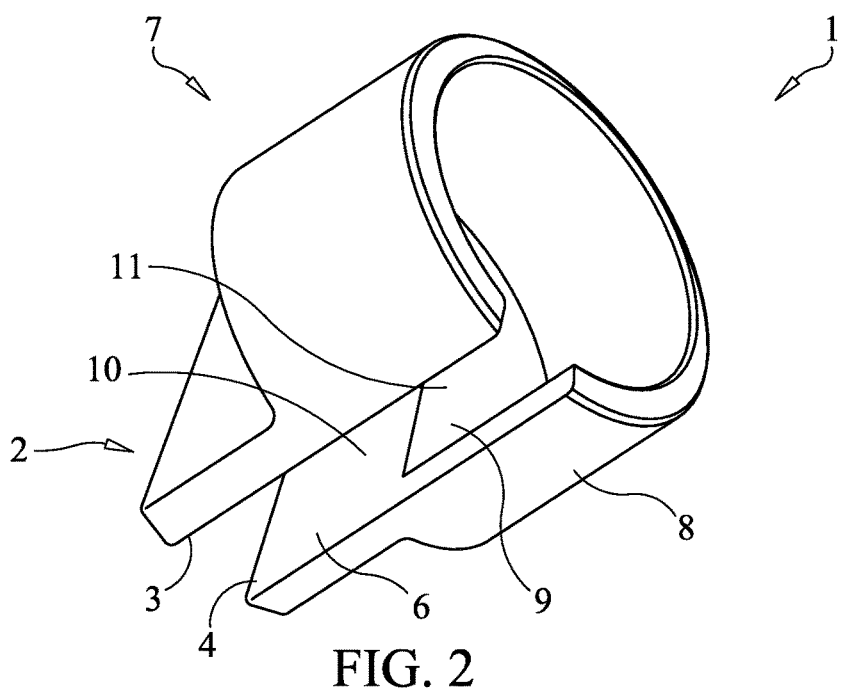
FIG. 2 is a perspective view of the embodiment in FIG. 1.
Figure 3:
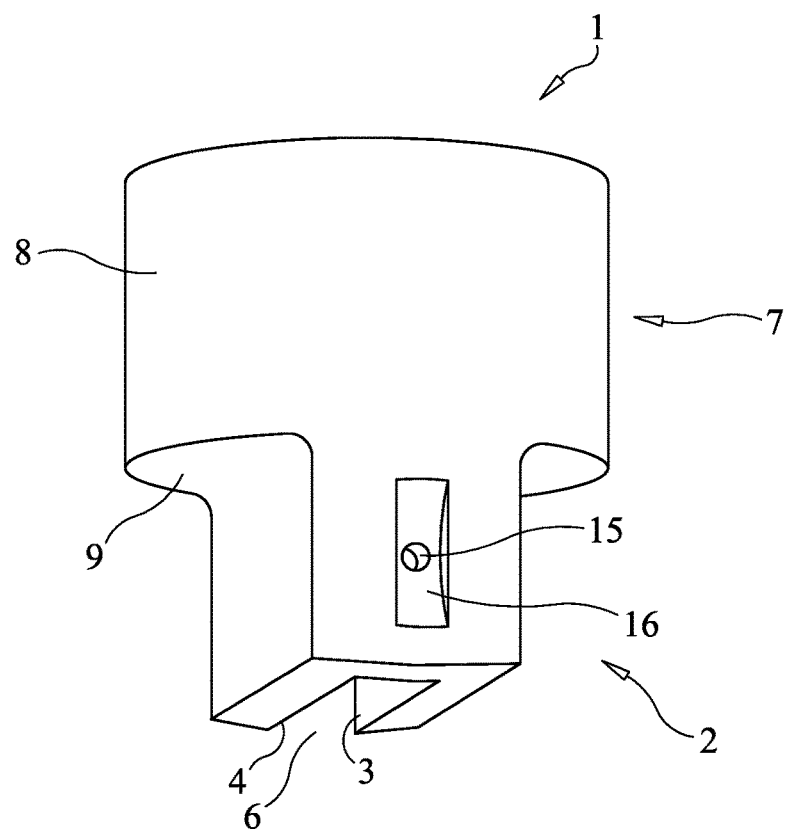
FIG. 3 is a back view of an embodiment of the invention.
Figure 4:
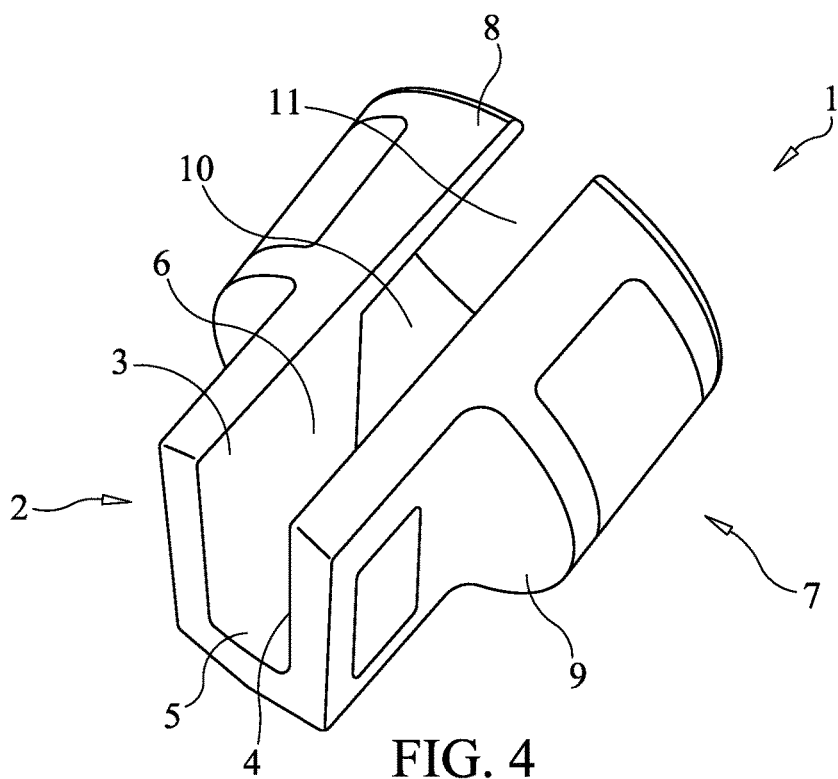
FIG. 4 is a lower perspective view of an embodiment of the invention.

One embodiment of the invention is shown in FIGS. 2-4. A lower body or shaft holding segment 2 is generally rectangular solid shaped, having a slot 6 formed by a pair of opposing side walls 3, 4 and a proximal or rear wall 5 of sufficient thickness to support the weight of a pair of ski poles. The distance between the inner faces of the side walls 3, 4 is slightly greater than the diameter of the shaft of the target ski pole, but smaller than the diameter of the ski pole's handle. The distal or front wall is not closed, but rather the space between the opposing inner side walls extend to the front, so a slot 6, slightly wider than the diameter of a target ski pole is formed, giving the lower body segment approximately an elongated U shape.

In this embodiment, the upper body or handle retaining segment 7 is generally circular in shape, with a raised peripheral wall 8. The top of the handle retaining segment is open, and the bottom or floor 9 of this segment is closed except for a slot 10 corresponding to (i.e., aligned with and having the same dimension as slot 6). The raised peripheral wall is closed around almost the entire circumference, except that portion that is aligned with the slot 6 in the shaft holding segment and the slot 10 in the floor of the handle retaining segment. An opening 11 in the front and an opening 10 in the floor of the handle retaining segment align with, and are the same width as, the slot 6 in the shaft holding segment. A ski pole is inserted into the holder by lifting the entire handle above the top of the raised peripheral wall and sliding the pole shaft into the slot in the upper and lower segments, then allowing the pole to drop so that its handle portion rests on the floor of the upper segment.

In this embodiment, the pole easily enters the holder because the slot is slightly wider than the diameter of the pole. The pole cannot fall through the floor 9 because the slot 10 in the floor is narrower than the diameter of the handle. Moreover, the pole cannot, while resting on the floor, accidentally be pushed out of the holder because the opening 11 in the front of the raised sidewalls 8 is also narrower than the diameter of the handle. To remove the pole from the holder, the entire pole must be lifted so that the bottom of the pole handle is above the top of the holder's raised sidewalls 8, so the shaft can pass out through the opening 11.

In one embodiment, the width of the slot in the lower body and upper body is about ¾ inch to about 1 inch (20-25 mm). The upper segment is circular, with an outside diameter of about 4½ inches (115 mm) and inside diameter of about 3½ inches (89 mm), having a sidewall about ½ inch (13 mm) thick and 2¾ inches (70 mm) high all around. The lower segment is about 4½ inches (115 mm) front to back, corresponding to the diameter of the upper segment, about 2 inches (50 mm) wide and about 2¼ inches (57 mm) from its top to its bottom. The length of the slot is about 3½ inches (89 mm), leaving a 1 inch (20 mm) back wall to support attachment forces generated between the holder and the bar to which it is attached. This configuration easily accommodates the handle and shaft sizes of standard downhill poles and more complex specialty configurations.

Figure 5:
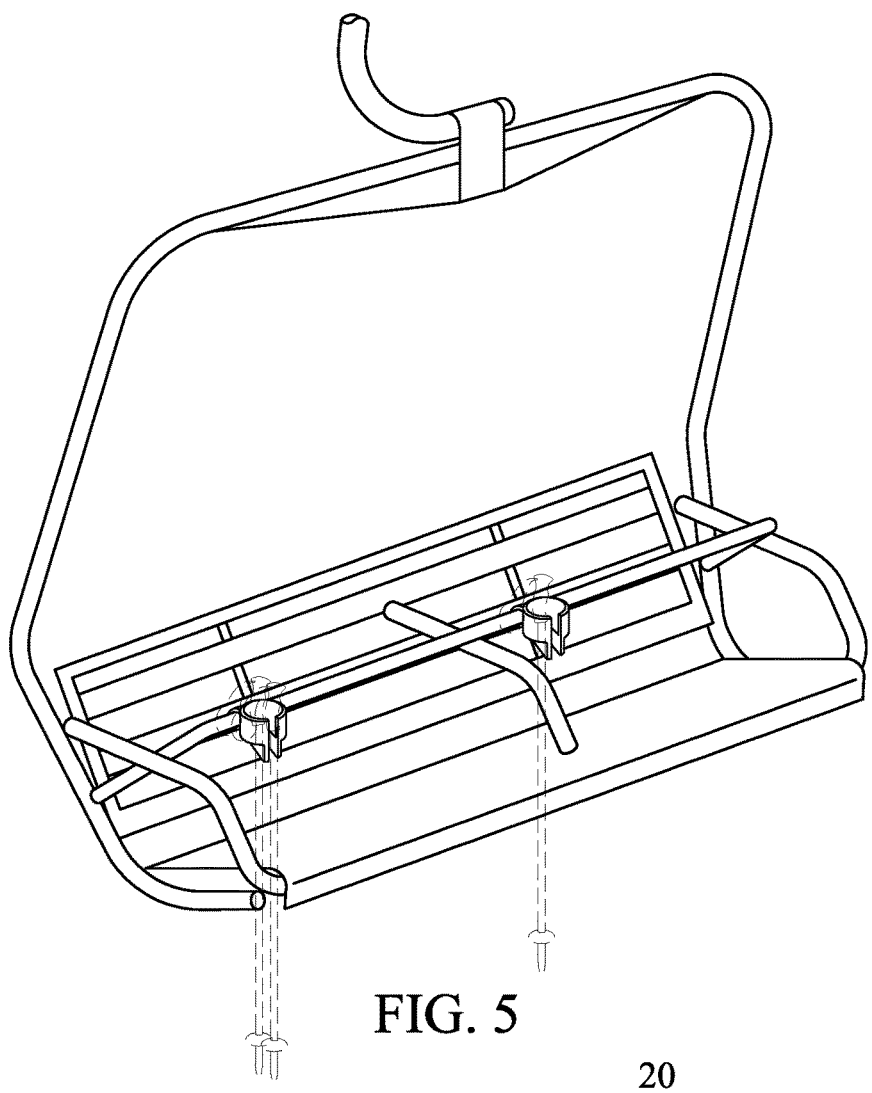
FIG. 5 is a perspective view of one embodiment of the invention in place on a ski lift.

The ski pole holder may be attached to the chairlift in a variety of ways. Many chairlifts include a safety bar that rises out of the way when skiers enter or exit the seat, and pulls down to provide a solid bar in front of the lift passengers. It may be desirable to position a pole holder in front of (either directly in front or offset slightly) each of the 2-8 passenger positions on the lift, as illustrated in FIG. 5. One means of attachment might be a bolt passed through a hole in the back wall of the lower segment or the upper segment of the holder and through a corresponding hole or holes in the safety bar, to be secured by a lock nut or other fastener.

The pole holder may also be fabricated integrally with the safety bar when the bar is manufactured, or welded in place using appropriate techniques. It can also be mounted directly from the back of the ski pole holder into place by use of an attached clamp or collar. The ski pole holder could be made with a recessed or indented cutout at a 180 or 90 degree angle, and various cantered angles to accommodate for alternative mountings that fit the collar or clamp into the ski pole holder's back section just deep enough to prevent it from rotating. A variety of clamps, collars or additions that help it to be mounted in a certain position or place on the restraining bar or side rail of the chair on a ski lift can be used to secure the ski pole holder.

Figure 6:
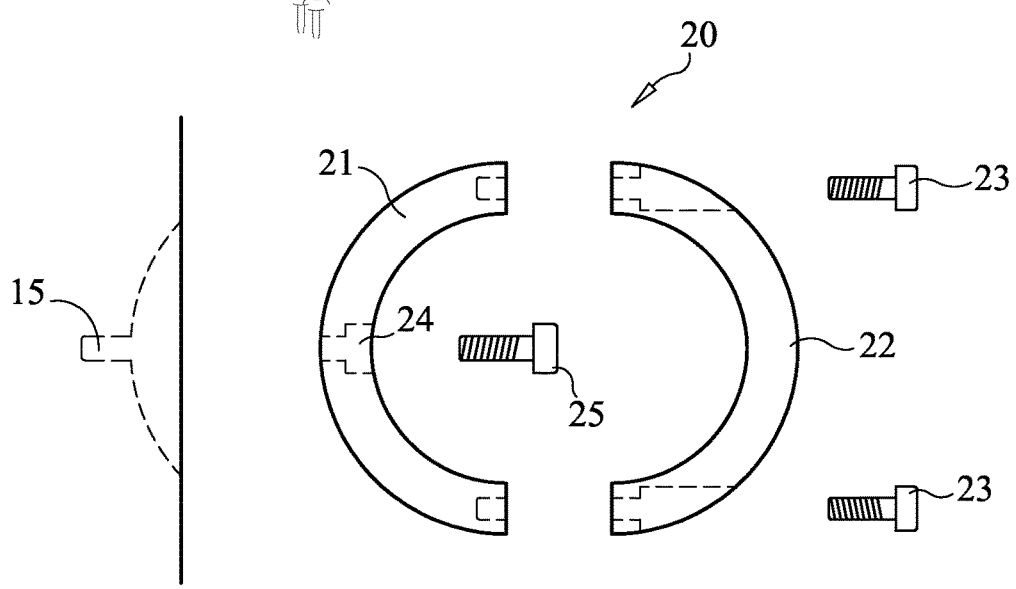
FIG. 6 is an exploded view of a way to attach an embodiment of the invention to a ski lift safety bar.

One embodiment of the present invention may incorporate a collar clamp to attach the holder to the bar. As seen in FIG. 6, a collar clamp 20 may be made in two pieces 21, 22, which are placed around the bar and joined together with tightening screws 23. A hole 24 in the center of one of the pieces allows a fixation screw 25 to pass through and engage with a threaded receiver 15 in the back wall of the pole holder. Alternatively, the threaded receiver could be in the collar clamp, with the fixation screw passing through a hole in the back wall of the pole holder, or a bolt could be used for fixation, passing through a hole in the back wall of the pole holder and secured with a nut.

In an embodiment illustrated in FIG. 3, a vertical groove 16, corresponding in shape and dimension to a portion of a collar clamp, is formed in the exterior face of the back wall of the lower segment of the pole holder. The collar clamp fits snugly into the groove as it is attached to the pole holder. The groove prevents the pole holder from rotating out of position around the axis of the fixation screw.

Figure 7:
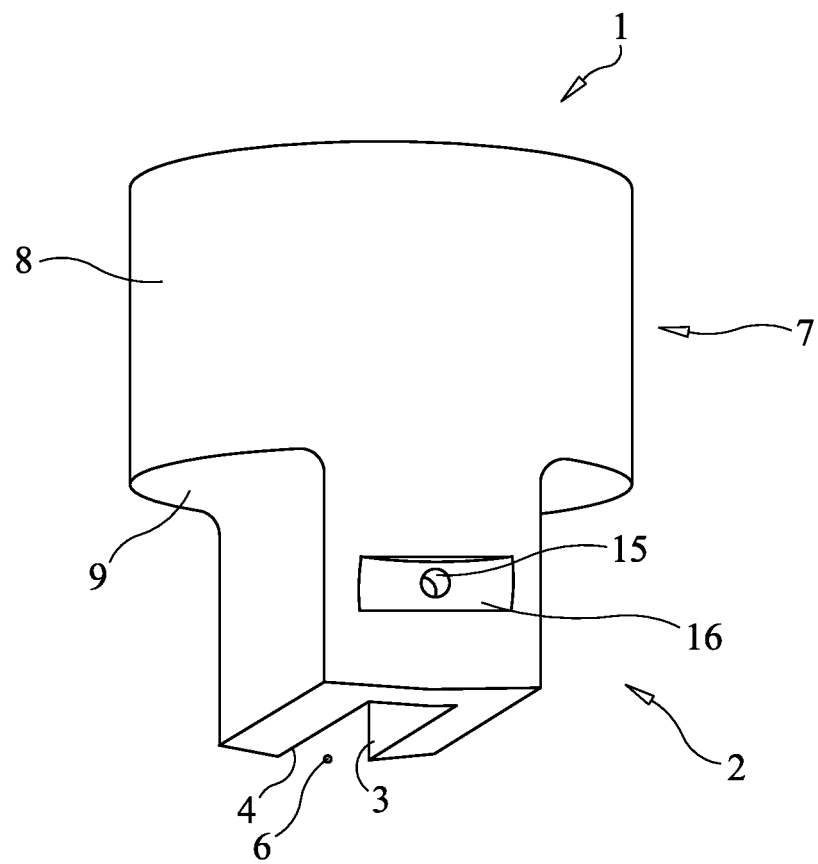
FIG. 7 is a back view of another embodiment of the invention.

In another embodiment, the pole holder is configured to attach to a vertical bar on the ski lift chair, usually part of the outside support on either side of the chair. Such a configuration would be useful for lifts that do not have safety bars. An embodiment with a collar clamp 20 positions the clamp at 90 degrees rotation so the holder remains upright when attached to the vertical bar. In an embodiment having a groove 16 in the exterior face of the back wall of the pole holder, the groove is aligned horizontally rather than vertically. See FIG. 7.

Figure 8:
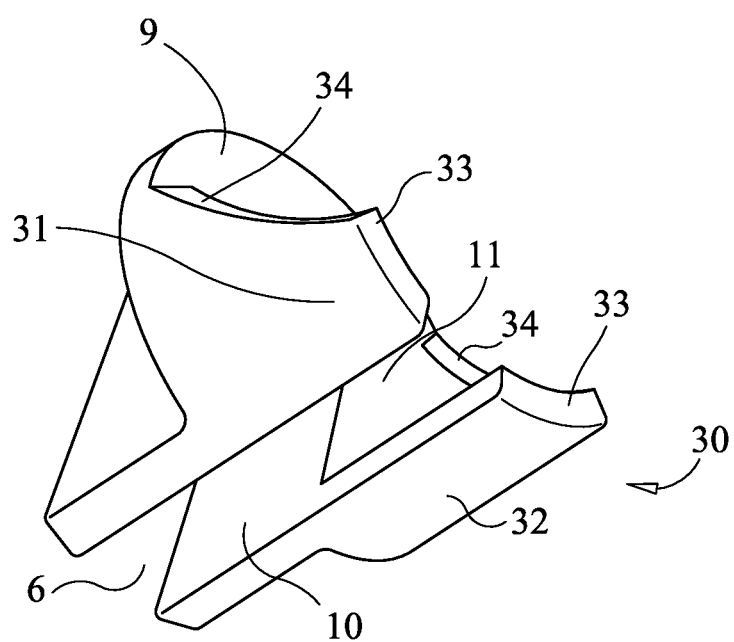
FIG. 8 is a different embodiment of the invention.

In yet another embodiment, the upper body segment may take the form of a front guard rather than an encircling sidewall, as shown in FIG. 8. The lower body segment is substantially the same as in previously-described embodiments. The upper body segment has a floor 9 with a slot 10 aligned with the slot 6 in the lower body segment. The upper body segment has a raised split front peripheral wall 30 connected to the floor 9, and comprising two raised front wall parts 31, 32 separated by a space 11 that aligns with slot 10 and slot 6. Each raised front wall part has a short top section 33 extending approximately twice the width of the separation space, and a tapered upper edge 34 from the top section 33 to the floor 9. In the illustrated embodiment the taper is curvilinear. When this embodiment is used, the floor 9 of the upper segment prevents the pole handle from falling, and the split front wall 30 prevents the pole handle from sliding forward out of the unit.

The general shape of the upper body segment does not have to be circular, although that form is the most efficient for its ratio of surface area to perimeter. What is needed is an upper body segment that has a floor large enough to accommodate a pair of ski pole handles.

The disclosed embodiments may be molded in one piece from polyurethane or other synthetic material that can withstand the harsh climate conditions and year-round outdoor exposure at a ski resort. They may also be fabricated in parts and attached together, or could be made of metal, integral with or attached to the lift safety bars or side bars.

The foregoing description has been presented and is intended for the purposes of illustration and description. It is not intended to be exhaustive nor limit the invention to the above teachings. The embodiments were chosen and described in order to best explain the principles of the invention and its practical application and to enable others skilled in the art to best utilize the invention in various embodiments and with various modifications as are suited to the particular use contemplated. Therefore, it is intended that the invention not be limited to the particular embodiments disclosed for carrying out the invention.

I claim:

1. A ski pole holder for carrying at least a matched pair of ski poles having shafts and handles, in which the handle diameter is greater than the shaft diameter, comprising
   a shaft holding segment comprising a rectangular solid base having a shaft holding slot that is wider than the shaft diameter and narrower than the handle diameter and longer than twice the handle diameter; and
   a handle retaining segment attached above and abutting the shaft holding segment, comprising a flat, circular floor with a floor slot corresponding to the shaft holding slot, and an elevated peripheral wall around a portion of a periphery of the floor having a front opening in the wall aligned with and the same width as the shaft holding slot;
   wherein the floor is large enough to hold a pair of ski pole handles within the peripheral wall; and wherein the ski pole holder is attachable to a bar on a ski lift chair by a fastener on an external side opposite to the front opening.

2. The ski pole holder of claim 1, wherein the shaft holding slot extends from a front surface thereof to a point near a back surface thereof.

3. The ski pole holder of claim 2, wherein the handle retaining segment has an outside diameter of approximately 4½ inches and the length of the slot is approximately 3½ inches.

4. The ski pole holder of claim 3, further including a circular collar clamp attached to an exterior back surface of the shaft holding segment for attaching the holder to the bar.

5. The ski pole holder of claim 3 wherein the peripheral wall is approximately one half inch thick and about 2½ inches high.

6. The ski pole holder of claim 3 wherein the slot is between about ¾ inch and about one inch wide.

7. The ski pole holder of claim 1, wherein the handle retaining segment has an outside diameter of approximately 4½ inches and the length of the slot is approximately 3½ inches.

8. The ski pole holder of claim 7 wherein the peripheral wall is approximately one half inch thick and about 2½ inches high.

9. The ski pole holder of claim 7 wherein the slot is between about ¾ inch and about one inch wide.

10. The ski pole holder of claim 1, further including a circular collar clamp attached to an exterior back surface of the shaft holding segment for attaching the holder to the bar.

11. A ski pole holder for carrying at least a matched pair of ski poles having shafts and handles, in which the handle diameter is greater than the shaft diameter, comprising
    a shaft holding segment comprising a rectangular solid base having a shaft holding slot extending from a front surface of the base to a point near a back surface thereof, that is wider than the shaft diameter and narrower than the handle diameter; and
    a handle retaining segment attached above and abutting the shaft holding segment, comprising a flat floor with a floor slot corresponding to the shaft holding slot, and an elevated front wall on a portion of a periphery of the floor, having a front opening aligned with and the same width as the shaft holding slot;
    wherein the floor is large enough to hold a pair of ski pole handles; the slot is longer than twice the handle diameter and the ski pole holder is attachable to a bar on a ski lift chair by a fastener on an external side opposite to the front opening.

12. The ski pole holder of claim 11, wherein the shaft holding slot is between about ¾ inch and about one inch wide and about 3½ inches long.

13. The ski pole holder of claim 12, further including a circular collar clamp attached to an exterior back surface of the shaft holding segment for attaching the holder to the bar.

14. A ski pole holder comprising
    a shaft holding segment comprising a solid base having a shaft holding slot that is between about ¾ inch and about one inch wide and about 3½ inches long; and
    a handle retaining segment attached above the shaft holding segment, comprising a flat, circular floor about 4½ inches in diameter with a floor slot corresponding to the shaft holding slot, and an elevated peripheral wall about 2½ inches high around a portion of a periphery of the floor, further having a front opening in the wall aligned with and the same width as the shaft holding slot; and wherein the ski pole holder is attachable, by a fastener on an external side opposite to the front opening, to a bar on a ski lift chair.

15. The ski pole holder of claim 14 wherein the peripheral wall is about one half inch thick.

16. The ski pole holder of claim 15, wherein the shaft holding segment is shaped as a rectangular solid and the slot extends from a front surface thereof to a point near a back surface thereof.

\* \* \* \* \*